US012632941B2

(12) United States Patent
Ravindran et al.

(10) Patent No.: US 12,632,941 B2
(45) Date of Patent: May 19, 2026

(54) IDENTIFYING SALIENT REGIONS BASED ON MULTI-RESOLUTION PARTITIONING

(71) Applicant: Adobe Inc., San Jose, CA (US)

(72) Inventors: Sriram Ravindran, Milpitas, CA (US); Debraj Debashish Basu, Sunnyvale, CA (US)

(73) Assignee: Adobe Inc., San Jose, CA (US)

( * ) Notice: Subject to any disclaimer, the term of this patent is extended or adjusted under 35 U.S.C. 154(b) by 280 days.

(21) Appl. No.: 18/458,778

(22) Filed: Aug. 30, 2023

(65) Prior Publication Data

US 2025/0078220 A1      Mar. 6, 2025

(51) Int. Cl.
  *G06T 5/75*      (2024.01)
  *G06V 10/46*      (2022.01)
  *G06V 10/82*      (2022.01)
(52) U.S. Cl.
  CPC ............... *G06T 5/75* (2024.01); *G06V 10/46* (2022.01); *G06V 10/82* (2022.01)
(58) Field of Classification Search
  CPC ........... G06T 5/75; G06V 10/46; G06V 10/82
  See application file for complete search history.

(56) References Cited

U.S. PATENT DOCUMENTS

| | | | | |
|---|---|---|---|---|
| 10,521,699 B2 * | 12/2019 | Bremer | ................. | G06V 10/764 |
| 11,282,208 B2 * | 3/2022 | Cohen | ....................... | G06T 7/12 |
| 11,430,084 B2 * | 8/2022 | Stent | ......................... | G06N 3/08 |
| 12,020,400 B2 * | 6/2024 | Hsieh | .................... | G06V 10/806 |
| 2016/0012293 A1 * | 1/2016 | Mate | ...................... | G06V 20/40 |
| | | | | 382/100 |
| 2019/0340462 A1 * | 11/2019 | Pao | ......................... | G06V 10/82 |
| 2020/0074589 A1 * | 3/2020 | Stent | .................... | G06V 10/462 |
| 2020/0143194 A1 * | 5/2020 | Hou | ....................... | G06V 10/40 |

OTHER PUBLICATIONS

"The Pascal Visual Object Classes Challenge 2007", Pascal Network [retrieved Oct. 5, 2023]. Retrieved from the Internet <http://host.robots.ox.ac.uk/pascal/VOC/voc2007/>., Apr. 7, 2007, 6 pages.
"Visual Object Classes Challenge 2012 (VOC2012)", Pascal Network [retrieved Oct. 5, 2023]. Retrieved from the Internet <http://host.robots.ox.ac.uk/pascal/VOC/voc2012/>, Feb. 20, 2012, 11 pages.

(Continued)

*Primary Examiner* — John B Strege

(74) *Attorney, Agent, or Firm* — FIG. 1 Patents

(57) ABSTRACT

In implementation of techniques for generating salient regions based on multi-resolution partitioning, a computing device implements a salient object system to receive a digital image including a salient object. The salient object system generates a first mask for the salient object by partitioning the digital image into salient and non-salient regions. The salient object system also generates a second mask for the salient object that has a resolution that is different than the first mask by partitioning a resampled version of the digital image into salient and non-salient regions. Based on the first mask and the second mask, the salient object system generates an indication of a salient region of the digital image using a machine learning model. The salient object system then displays the indication of the salient region in a user interface.

20 Claims, 7 Drawing Sheets

(56) References Cited

OTHER PUBLICATIONS

Aflalo, Amit et al., "DeepCut: Unsupervised Segmentation using Graph Neural Networks Clustering", Cornell University arXiv, arXiv.org [retrieved Jun. 14, 2023]. Retrieved from the Internet <https://arxiv.org/pdf/2212.05853.pdf>., Dec. 18, 2022, 10 Pages.

Allard, William K. , "Total variation regularization for image denoising, i. geometric theory", SIAM J. Math. Anal, vol. 39, No. 4 [retrieved Jun. 14, 2023]. Retrieved from the Internet <https://services.math.duke.edu/~wka/66261.pdf>., 2007, 41 Pages.

Barron, Jonathan et al., "The Fast Bilateral Solver", Cornell University arXiv, arXiv.org [retrieved Jun. 14, 2023]. Retrieved from the Internet <https://arxiv.org/pdf/1511.03296.pdf>., Jul. 22, 2016, 50 pages.

Bielsk, Adam et al., "MOVE: unsupervised movable object segmentation and detection", Cornell University arXiv, arXiv.org [retrieved Jun. 14, 2023]. Retrieved from the Internet <https://arxiv.org/pdf/2210.07920.pdf>., Oct. 20, 2022, 26 Pages.

Borji, Ali et al., "Salient object detection: A survey", Computational Visual Media, vol. 5, No. 2 [retrieved Jun. 14, 2023]. Retrieved from the Internet <https://link.springer.com/article/10.1007/s41095-019-0149-9>., Jun. 21, 2019, 34 Pages.

Caron, Mathilde et al., "Emerging Properties in Self-Supervised Vision Transformers", Cornell University arXiv, arXiv.org [retrieved Aug. 10, 2023]. Retrieved from the Internet <https://arxiv.org/pdf/2104.14294.pdf>., May 24, 2021, 21 Pages.

Caron, Mathilde et al., "Unsupervised learning of visual features by contrasting cluster assignments", Advances in Neural Information Processing Systems 33 [retrieved Jun. 14, 2023]. Retrieved from the Internet <https://hal.science/hal-02883765v1/document>., Mar. 28, 2023, 21 Pages.

Chen, Mickaël et al., "Unsupervised Object Segmentation by Redrawing", Cornell University arXiv, arXiv.org [retrieved Jun. 14, 2023]. Retrieved from the Internet <https://arxiv.org/pdf/1905.13539.pdf>., Nov. 29, 2019, 18 Pages.

Chen, Xinlei et al., "Improved Baselines with Momentum Contrastive Learning", Cornell University arXiv, arXiv.org [retrieved Jun. 14, 2023]. Retrieved from the Internet <https://arxiv.org/pdf/2003.04297.pdf)>., Mar. 9, 2020, 3 Pages.

Cheng, Bowen et al., "Per-Pixel Classification is Not All You Need for Semantic Segmentation", Cornell University arXiv, arXiv.org [retrieved Jun. 14, 2023]. Retrieved from the Internet <https://arxiv.org/pdf/2107.06278.pdf>., Oct. 31, 2021, 17 Pages.

De Lutio, Riccardo et al., "Guided Super-Resolution as Pixel-to-Pixel Transformation", Cornell University arXiv, arXiv.org [retrieved Jun. 14, 2023]. Retrieved from the Internet <http://128.84.21.203/pdf/1904.01501>., Aug. 15, 2019, 10 Pages.

De Lutio, Riccardo et al., "Learning Graph Regularisation for Guided Super-Resolution", Cornell University arXiv, arXiv.org [retrieved Jun. 14, 2023]. Retrieved from the Internet <https://arxiv.org/pdf/2203.14297.pdf>., Mar. 27, 2022, 15 Pages.

Deng, Jia et al., "ImageNet: A Large-Scale Hierarchical Image Database", In Proceedings of IEEE Conference on Computer Vision and Pattern Recognition [retrieved Jun. 14, 2023]. Retrieved from the Internet <https://www-cs-faculty.stanford.edu/groups/vision/documents/ImageNet_CVPR2009.pdf>., Jun. 20, 2009, 8 pages.

Devlin, Jacob et al., "BERT: Pre-Training of Deep Bidirectional Transformers for Language Understanding", Cornell University, arXiv Preprint, arXiv.org [retrieved on Jun. 14, 2023]. Retrieved from the Internet <https://arxiv.org/pdf/1810.04805.pdf>., May 24, 2019, 16 pages.

Dosovitskiy, Alexey et al., "An image is worth 16×16 words: Transformers for image recognition at scale.", Cornell University arXiv, arXiv.org [retrieved Jun. 29, 2023]. Retrieved from the Internet <https://arxiv.org/pdf/2010.11929.pdf>., Jun. 3, 2021, 22 Pages.

Estrela, Vania V. et al., "Total Variation Applications in Computer Vision", Cornell University arXiv, arXiv.org [retrieved Jun. 14, 2023]. Retrieved from the Internet <https://arxiv.org/ftp/arxiv/papers/1603/1603.09599.pdf>., Mar. 2016, 24 Pages.

Gatti, Alice et al., "Deep Learning and Spectral Embedding for Graph Partitioning", Cornell University arXiv, arXiv.org [retrieved Jun. 14, 2023]. Retrieved from the Internet <https://arxiv.org/pdf/2110.08614.pdf>., Dec. 8, 2021, 12 Pages.

Gatti, Alice et al., "Graph Partitioning and Sparse Matrix Ordering using Reinforcement Learning and Graph Neural Networks", Cornell University arXiv, arXiv.org [retrieved Jun. 14, 2023]. Retrieved from the Internet <https://arxiv.org/pdf/2104.03546.pdf>., Jun. 28, 2021, 24 Pages.

Hamilton, Mark et al., "Unsupervised semantic segmentation by distilling feature correspondences", Cornell University arXiv, arXiv.org [retrieved Jun. 14, 2023]. Retrieved from the Internet <https://arxiv.org/pdf/2203.08414.pdf>., Mar. 16, 2022, 26 Pages.

He, Kaiming et al., "Masked Autoencoders Are Scalable Vision Learners", Cornell University arXiv, arXiv.org [retrieved Jun. 14, 2023]. Retrieved from the Internet <https://arxiv.org/pdf/2111.06377.pdf>., Dec. 19, 2021, 14 Pages.

Hou, Xianxu et al., "FEAT: Face Editing with Attention", Cornell University arXiv, arXiv.org [retrieved Jun. 14, 2023]. Retrieved from the Internet <https://arxiv.org/pdf/2202.02713.pdf>., Feb. 6, 2022, 14 Pages.

Kingma, Diederik P. et al., "Adam: A Method for Stochastic Optimization", Cornell University, arXiv Preprint, arXiv.org [retrieved Aug. 9, 2023]. Retrieved from the Internet <https://arxiv.org/pdf/1412.6980.pdf>., Jan. 30, 2017, 15 pages.

Krahenbuhl, Philipp et al., "Efficient Inference in Fully Connected CRFs with Gaussian Edge Potentials", Advances in Neural Information Processing Systems 24 [retrieved Jun. 14, 2023]. Retrieved from the Internet <https://proceedings.neurips.cc/paper_files/paper/2011/file/beda24c1e1b46055dff2c39c98fd6fc1-Paper.pdf>., Dec. 14, 2011, 9 pages.

Lafferty, John et al., "Conditional random fields: Probabilistic models for segmenting and labeling sequence data", Department of Computer and Information Science, University of Pennsylvania [retrieved Jun. 14, 2023]. Retrieved from the Internet <https://repository.upenn.edu/cgi/viewcontent.cgi?article=1162&context=cis_papers>., Jun. 28, 2001, 10 Pages.

Lin, Tsung-Yi et al., "Microsoft COCO: Common Objects in Context", Cornell University arXiv, arXiv.org [retrieved Jun. 14, 2023]. Retrieved from the Internet <https://arxiv.org/pdf/1405.0312.pdf>., Feb. 21, 2015, 15 Pages.

Liu, Jiaming et al., "Image restoration using total variation regularized deep image prior", Cornell University arXiv, arXiv.org [retrieved Jun. 14, 2023]. Retrieved from the Internet <https://arxiv.org/pdf/1810.12864.pdf>., Oct. 30, 2018, 8 Pages.

Liu, Tie et al., "Learning to Detect a Salient Object", IEEE Transactions on Pattern Analysis and Machine Intelligence vol. 33, No. 2 [retrieved Jun. 14, 2023]. Retrieved from the Internet <http://mmlab.ie.cuhk.edu.hk/archive/2007/CVPR07_detect.pdf>., Jun. 17, 2007, 8 pages.

Melas-Kyriazi, Luke et al., "Deep Spectral Methods: A Surprisingly Strong Baseline for Unsupervised Semantic Segmentation and Localization", Cornell University arXiv, arXiv.org [retrieved Jun. 14, 2023]. Retrieved from the Internet <http://128.84.21.203/pdf/2205.07839>., Jun. 2022, 25 Pages.

Melas-Kyriazi, Luke et al., "Finding an Unsupervised Image Segmenter in Each of Your Deep Generative Model", Cornell University arXiv, arXiv.org [retrieved Jun. 14, 2023]. Retrieved from the Internet <https://arxiv.org/pdf/2105.08127.pdf>., May 17, 2021, 18 Pages.

Ortega, Antonio et al., "Graph Signal Processing: Overview, Challenges and Applications", Cornell University arXiv, arXiv.org [retrieved Jun. 14, 2023]. Retrieved from the Internet <https://arxiv.org/pdf/1712.00468.pdf>., Mar. 26, 2018, 20 Pages.

Qin, Xuebin et al., "U 2-Net: Going Deeper with Nested U-Structure for Salient Object Detection", Cornell University arXiv, arXiv.org [retrieved Jun. 14, 2023]. Retrieved from the Internet <https://arxiv.org/pdf/2005.09007.pdf>., Mar. 8, 2022, 15 Pages.

Revanur, Ambareesh et al., "CoralStyleCLIP: Co-optimized Region and Layer Selection for Image Editing", Cornell University arXiv, arXiv.org [retrieved Jun. 14, 2023]. Retrieved from the Internet <https://arxiv.org/pdf/2303.05031.pdf>., Mar. 9, 2023, 19 Pages.

(56)                References Cited

OTHER PUBLICATIONS

Savarese, Pedro , "Information-Theoretic Segmentation by Inpainting Error Maximization", Cornell University arXiv, arXiv.org [retrieved Jun. 14, 2023]. Retrieved from the Internet <https://arxiv.org/pdf/2012.07287.pdf>., Jun. 29, 2021, 13 Pages.

Shi, Jianbo et al., "Normalized Cuts and Image Segmentation", IEEE Transactions on Pattern Analysis and Machine Intelligence, vol. 22, No. 8 [retrieved Jun. 14, 2023]. Retrieved from the Internet <https://www.cs.swarthmore.edu/~turnbull/cs97/f08/paper/shi97.pdf>., Aug. 1, 2000, 7 Pages.

Shi, Jianping et al., "Hierarchical Image Saliency Detection on Extended CSSD", IEEE Transactions on Pattern Analysis and Machine Intelligence vol. 38, No. 4 [retrieved Jun. 14, 2023]. Retrieved from the Internet <https://arxiv.org/pdf/1408.5418.pdf>., Aug. 4, 2015, 14 Pages.

Shin, Gyungin et al., "NamedMask: Distilling Segmenters from Complementary Foundation Models", Cornell University arXiv, arXiv.org [retrieved Jun. 14, 2023]. Retrieved from the Internet <https://arxiv.org/pdf/2209.11228.pdf>., Sep. 22, 2022, 11 Pages.

Shin, Gyungin et al., "Unsupervised Salient Object Detection with Spectral Cluster Voting", Cornell University arXiv, arXiv.org [retrieved Jun. 14, 2023]. Retrieved from the Internet <https://arxiv.org/pdf/2203.12614.pdf>., Mar. 23, 2022, 14 Pages.

Simeoni, Oriane et al., "Localizing objects with self-supervised transformers and no labels", Cornell University arXiv, arXiv.org [retrieved Jun. 14, 2023]. Retrieved from the Internet <https://arxiv.org/pdf/2109.14279.pdf>., Sep. 29, 2021, 25 Pages.

Siméoni, Oriane et al., "Unsupervised Object Localization: Observing the Background to Discover Objects", Cornell University arXiv, arXiv.org [retrieved Jun. 14, 2023]. Retrieved from the Internet <https://arxiv.org/pdf/2212.07834.pdf>., Mar. 29, 2023, 16 Pages.

Tang, Meng et al., "Normalized Cut Loss for Weakly-supervised CNN Segmentation", Cornell University arXiv, arXiv.org [retrieved Jun. 14, 2023]. Retrieved from the Internet <https://arxiv.org/pdf/1804.01346.pdf>., Apr. 4, 2018, 10 Pages.

Vo, Huy , "Toward Unsupervised, Multi-Object Discovery in Large-Scale Image Collections", Cornell University arXiv, arXiv.org [retrieved Jun. 14, 2023]. Retrieved from the Internet <https://arxiv.org/pdf/2007.02662.pdf>., Aug. 25, 2020, 25 Pages.

Vo, Van Huy et al., "Large-Scale Unsupervised Object Discovery", Advances in Neural Information Processing Systems 34 [retrieved Jun. 14, 2023]. Retrieved from the Internet <https://proceedings.neurips.cc/paper_files/paper/2021/file/8bf1211fd4b7b94528899de0a43b9fb3-Paper.pdf>., Nov. 9, 2021, 15 Pages.

Voynov, Andrey et al., "Object Segmentation Without Labels with Large-Scale Generative Models", Cornell University arXiv, arXiv.org [retrieved Jun. 14, 2023]. Retrieved from the Internet <https://arxiv.org/pdf/2006.04988.pdf>., Jun. 11, 2021, 11 Pages.

Voynov, Andrey et al., "Unsupervised Discovery of Interpretable Directions in the GAN Latent Space", Cornell University arXiv, arXiv.org [retrieved Jun. 14, 2023]. Retrieved from the Internet <https://arxiv.org/pdf/2002.03754.pdf>., Jun. 24, 2020, 15 Pages.

Vu, Huy et al., "Unrolling of deep graph total variation for image denoising", Cornell University arXiv, arXiv.org [retrieved Jun. 14, 2023]. Retrieved from the Internet <https://arxiv.org/pdf/2010.11290.pdf>., Mar. 24, 2021, 5 Pages.

Wang, Lijun et al., "Learning to Detect Salient Objects with Image-level Supervision", IEEE Conference on Computer Vision and Pattern Recognition [retrieved Jun. 14, 2023]. Retrieved from the Internet <https://openaccess.thecvf.com/content_cvpr_2017/papers/Wang_Learning_to_Detect_CVPR_2017_paper. pdf>., Jul. 2017, 10 Pages.

Wang, Peng et al., "Salient object detection for searched web images via global saliency", IEEE Conference on Computer Vision and Pattern Recognition [retrieved Jun. 14, 2023]. Retrieved from the Internet <https://jingdongwang2017.github.io/Pubs/CVPR12-Saliency.pdf>., Jun. 2012, 8 Pages.

Wang, Wenguan et al., "Salient Object Detection in the Deep Learning Era: An In-depth Survey", Cornell University arXiv, arXiv.org [retrieved Jun. 14, 2023]. Retrieved from the Internet <https://arxiv.org/pdf/1904.09146.pdf>., Jan. 8, 2021, 20 Pages.

Wang, Xinlong , "FreeSOLO: Learning to Segment Objects without Annotations", IEEE/CVF Conference on Computer Vision and Pattern Recognition (CVPR)[retrieved Jun. 14, 2023]. Retrieved from the Internet <https://authors.library.caltech.edu/115596/1/2202.12181.pdf>., Jun. 2022, 13 Pages.

Wang, Xinlong et al., "SOLO: segmenting objects by locations", Cornell University arXiv, arXiv.org [retrieved Jun. 14, 2023]. Retrieved from the Internet <https://arxiv.org/pdf/1912.04488.pdf]>., Jul. 19, 2020, 19 Pages.

Wang, Yangtao et al., "Tokencut: Segmenting objects in images and videos with self-supervised transformer and normalized cut", Cornell University arXiv, arXiv.org [retrieved Jun. 14, 2023]. Retrieved from the Internet <https://arxiv.org/pdf/2209.00383.pdf>., Sep. 13, 2022, 13 Pages.

Wei, Xiu-Shen et al., "Unsupervised Object Discovery and Co-Localization by Deep Descriptor Transforming", Cornell University arXiv, arXiv.org [retrieved Jun. 14, 2023]. Retrieved from the Internet <https://arxiv.org/pdf/1707.06397.pdf>., Jul. 20, 2017, 16 Pages.

Wu, Z. et al., "An optimal graph theoretic approach to data clustering: theory and its application to image segmentation", IEEE Transactions on Pattern Analysis and Machine Intelligence, vol. 15, No. 11 [retrieved Jun. 14, 2023]. Retrieved from the Internet <https://citeseerx.ist.psu.edu/document?repid=rep1&type=pdf&doi=38683d51182dc2dba8234d28b571dab683506541>., Nov. 1993, 13 Pages.

Yang, Chuan et al., "Saliency detection via graph-based manifold ranking", IEEE Computer Society Conference on Computer Vision and Pattern Recognition [retrieved Jun. 14, 2023]. Retrieved from the Internet <https://www.cv-foundation.org/openaccess/content_cvpr_2013/papers/Yang_Saliency_Detection_via_2013_CVPR_paper.pdf>., 2013, 8 Pages.

Yun, Yi Ke et al., "Selfreformer: Self-refined network with transformer for salient object detection", Cornell University arXiv, arXiv.org [retrieved Jun. 14, 2023]. Retrieved from the Internet <https://arxiv.org/pdf/2205.11283.pdf>., Jul. 18, 2022, 10 Pages.

Zhou, Yuan et al., "Salient Object Detection via Fuzzy Theory and Object-Level Enhancement", IEEE Transactions on Multimedia, vol. 21, No. 1 [retrieved Jun. 14, 2023]. Retrieved from the Internet <https://doi.org/10.1109/TMM.2018.2845667>, Jan. 1, 2019, 12 pages.

* cited by examiner

200

400

402

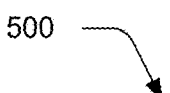

500

```
┌─────────────────────────────────────────────────────────────┐
│                             502                             │
│         Receive a digital image including a salient object   │
└─────────────────────────────────────────────────────────────┘
                               │
                               ▼
┌─────────────────────────────────────────────────────────────┐
│                             504                             │
│  Generate a first mask for the salient object by partitioning│
│           the digital image                                 │
│         into salient and non-salient regions                │
└─────────────────────────────────────────────────────────────┘
                               │
                               ▼
┌─────────────────────────────────────────────────────────────┐
│                             506                             │
│  Generate a second mask for the salient object that has a    │
│  resolution that is different than the first mask by         │
│  partitioning a resampled version of the digital image into  │
│            salient and non-salient regions                   │
└─────────────────────────────────────────────────────────────┘
                               │
                               ▼
┌─────────────────────────────────────────────────────────────┐
│                             508                             │
│  Generate an indication of a salient region of the digital   │
│  image based on the first mask and the second mask using a   │
│            machine learning model                            │
└─────────────────────────────────────────────────────────────┘
                               │
                               ▼
┌─────────────────────────────────────────────────────────────┐
│                             510                             │
│  Display the indication of the salient region in a user      │
│                       interface                              │
└─────────────────────────────────────────────────────────────┘
```

Fig. 5

600

602
Receive a digital image including a salient region

604
Generate a first mask for the salient region by partitioning embeddings of patches of the digital image

606
Generate a second mask for the salient region that has a resolution of the digital image by partitioning embeddings of patches of a resampled version of the digital image

608
Optimize the first mask based on the second mask using a machine learning model

610
Display the optimized first mask in a user interface

IDENTIFYING SALIENT REGIONS BASED ON MULTI-RESOLUTION PARTITIONING

BACKGROUND

In computer graphics, a digital image is a two-dimensional representation of visual information in a digital format. The digital image includes a grid of pixels, which are small squares or dots that contain a specific color value. When viewed together, the pixels combine to form an overall image. Digital images are used in various applications, including photography, graphic design, computer vision, and multimedia content. A salient region of a digital image refers to an area of the digital image that stands out or attracts more attention than its surroundings when observed by a viewer. Identifying salient regions in a digital image is useful for image processing and other applications. However, existing techniques for identifying salient regions in digital images cause errors and result in visual inaccuracies, computational inefficiencies, and increased power consumption in real world scenarios.

SUMMARY

Techniques and systems for generating salient regions based on multi-resolution partitioning are described. In an example, a salient object system receives a digital image including a salient object. The salient object system then generates a first mask for the salient object by partitioning the digital image into salient and non-salient regions. For example, the first mask is trained to minimize a normalized cut based on an adjacency matrix. In some examples, the first mask is generated using a Self-Distillation with No Labels (DINO) model to generate embeddings for patches of the digital image and processed by a transformer encoder.

The salient object system also generates a second mask for the salient object that has a resolution that is different than the first mask by partitioning a resampled version of the digital image into salient and non-salient regions. In some examples, the first mask and the second mask are generated simultaneously.

Using a machine learning model, the salient object system then generates an indication of a salient region of the digital image based on the first mask and the second mask. In some examples, the machine learning model is a Graph Total Variation Regularizer model that uses guided reconstruction to optimize the indication of the salient region. The salient object system then displays the indication of the salient region in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 5 depicts a procedure in an example implementation of generating salient regions based on multi-resolution partitioning.

FIG. 6 depicts a procedure in an additional example implementation of generating salient regions based on multi-resolution partitioning.

DETAILED DESCRIPTION

Overview

Figure 1:
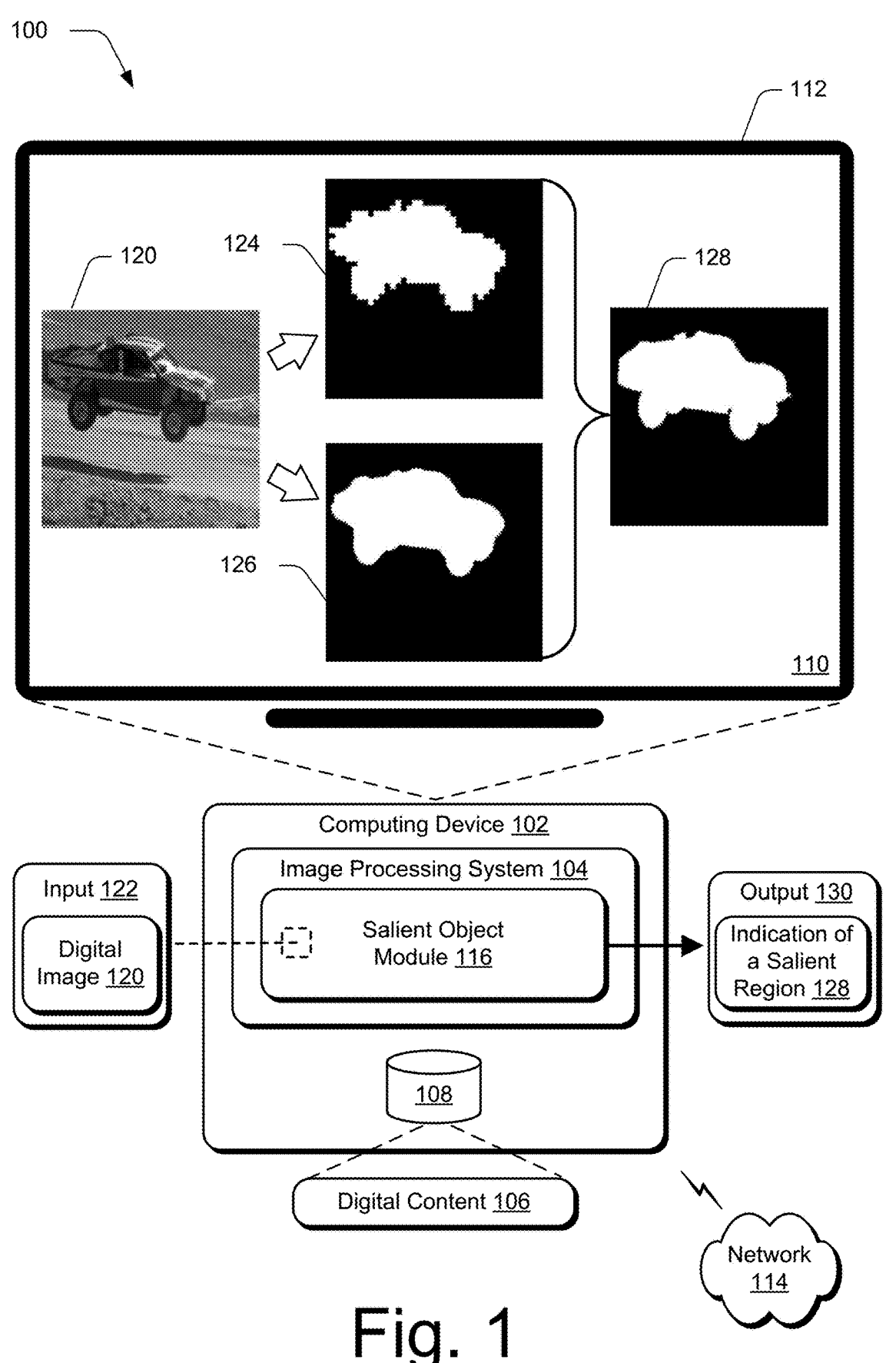
FIG. 1 is an illustration of a digital medium environment in an example implementation that is operable to employ techniques and systems for generating salient regions based on multi-resolution partitioning as described herein.

A salient region of a digital image is a portion of the digital image that stands out or draws attention due to its distinct visual characteristics from a perspective of a human viewer. For example, the salient region includes a salient object depicted in a foreground area of the digital image. Salient regions are identified by applications that process and tag digital content. For example, color extraction applications segment salient regions to accurately generate color histograms for salient objects in digital images.

Conventional applications that use unsupervised training to identify salient regions by generating a single low-resolution mask that roughly identifies a salient region. However, the single low-resolution mask does not adequately capture high frequency details at borders of the mask. These conventional applications also involve post-processing, including upscaling the mask while resulting in erosions to the mask. Alternative conventional applications exist that use supervised training to capture high frequency details but involve manual annotation of salient regions.

Techniques and systems are described for generating salient regions based on multi-resolution partitioning that overcome these limitations. A salient object system begins in this example by receiving a digital image that includes a salient object. For example, the digital image depicts a car in the foreground and a road in the background of the digital image. The car is the salient object because it is visually distinct compared to the road in the background. The region of the digital image that includes the car is the salient region.

To identify the salient region in the digital image, the salient object system simultaneously generates a coarse mask and a fine mask for the salient object. Although the coarse mask accurately identifies the salient region, it lacks fine boundary details of the salient region. For this reason, the fine mask, which includes fine boundary details, is generated and co-optimized with the coarse mask.

To generate the coarse mask, the salient object system first divides the digital image into a grid of patches using a self-supervised Self-Distillation with No Labels (DINO) model. A transformer encoder processes the patches to generate patch embeddings, and a partitioning model divides the patch embeddings into two partitions based on semantic similarities between the patch embeddings. The salient object system also generates an adjacency matrix that maps pairwise semantic similarity of the patches output from the DINO model onto points of a graph. The salient object module then uses a graph-based computer clustering algorithm, Normalized Cut (Ncut), that groups data points into distinct segments, to partition points represented on the adjacency matrix into a salient partition and a non-salient partition while minimizing the Ncut. The salient object system generates a coarse mask that identifies the salient region of the digital image based on the salient partition.

To generate the fine mask, the salient object system processes and scales up the patch embeddings output from the transformer encoder using a super-resolution network informed by the digital image. The salient object system than uses a fine partitioning model that divides the digital image into a salient partition and a non-salient partition using linear classification. The resulting partitions are passed through a pooling layer to shrink the partitions and to a generate a fine mask that has a level of resolution that matches the coarse mask. The fine mask captures high-frequency details of the of the digital image.

The salient object system uses guided reconstruction by leveraging a Graph Total Variation (GTV) model that co-optimizes the coarse mask and the fine mask in parallel to correct the coarse mask's inaccuracies while preserving fine boundary details of the fine mask. The GTV model analyzes nearby pixels that show similar behavior to determine which pixels belong to the salient region. In this way, the salient object system co-optimizes the coarse mask and the fine mask until a downsampled version of the fine mask is nearly identical to the coarse mask, resulting in an indication of a salient region.

Generating salient regions based on multi-resolution partitioning in this manner overcomes the disadvantages of conventional techniques that are limited to generating a single low-resolution mask for a salient region that has jagged and inaccurate boundary lines for the salient region. For example, simultaneously generating a coarse mask and a fine mask and co-optimizing the masks results in an indication of a salient region that a high level of accuracy from the coarse mask and the fine boundary details of the fine mask. Because high-frequency details are captured, generating salient regions based on multi-resolution partitioning also does not involve post-processing that erodes masks generated using conventional techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for generating salient regions based on multi-resolution partitioning described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 7.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a salient object module 116 which is illustrated as incorporated by the image processing system 104 to process the digital content 106. In some examples, the salient object module 116 is separate from the image processing system 104 such as in an example in which the salient object module 116 is available via the network 114.

The salient object module 116 is configured to generate an indication of a salient region 118 in a digital image 120. A salient region is an area within an image that stands out or is particularly noticeable compared to its surroundings. For example, the salient region is an object depicted in a foreground of the digital image 120. The indication of the salient region 118 identifies the salient region in the digital image 120 using a boundary line, mask, or other identifier.

To generate the indication of the salient region 128, the salient object module 116 first receives an input 122 including the digital image 120. Based on the digital image 120, the salient object module 116 simultaneously generates a coarse mask 124 and a fine mask 126.

To generate the coarse mask 124, the salient object module 116 uses a Self-Distillation with No Labels (DINO) model to break the digital image 120 into a grid of patches and generates embeddings for the patches. The DINO model is a self-supervised machine learning model that is trained to understand visual representations by solving pretext tasks on the given data. An adjacency matrix is then generated that maps pairwise semantic similarity of the patches output from the DINO model onto points of a graph. Additionally, a transformer encoder processes the patches output from the DINO model to generate patch embeddings, and a partitioning model predicts whether the patches are part of one of two partitions of the digital image 120. The salient object module 116 also uses Normalized Cut (Ncut), which is a graph-based computer clustering algorithm that groups data points into distinct segments, to partition points represented on the adjacency matrix into the one of the two partitions, such that a similarity between the partitions is low. The coarse mask 124 is a partition that is more prominent and estimates a location of the salient region in the digital image 120 than the other partition. Because the coarse mask 124 provides a rough estimation of a boundary of the salient region, a fine mask 126 that includes high-resolution detail is also generated simultaneously with the coarse mask 124.

To generate the fine mask 126, the salient object module 116 processes and scales up the digital image 120 based on the patch embeddings output from the Transformer Encoder.

A partitioning model then predicts whether processed features of the scaled up digital image are part of one of two partitions of the digital image 120 to generate an initial fine mask. The initial fine mask is then passed through a pooling layer to shrink the initial fine mask into a fine mask 126 that has a level of resolution that matches the coarse mask 124.

Based on the coarse mask 124 and the fine mask 126, the salient object module 116 generates an indication of a salient region 128 using guided reconstruction. For example, the salient object module 116 uses a Graph Total Variation (GTV) reconstruction model to optimize the indication of the salient region 118. The GTV model analyzes nearby pixels that show similar behavior to determine which pixels belong to the salient region. The salient object module 116 then generates an output 130 including the indication of a salient region 128 for display in the user interface 110. This allows the salient object to be accurately identified in the digital image 120.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating Salient Regions Based on Multi-Resolution Partitioning

Figure 2:
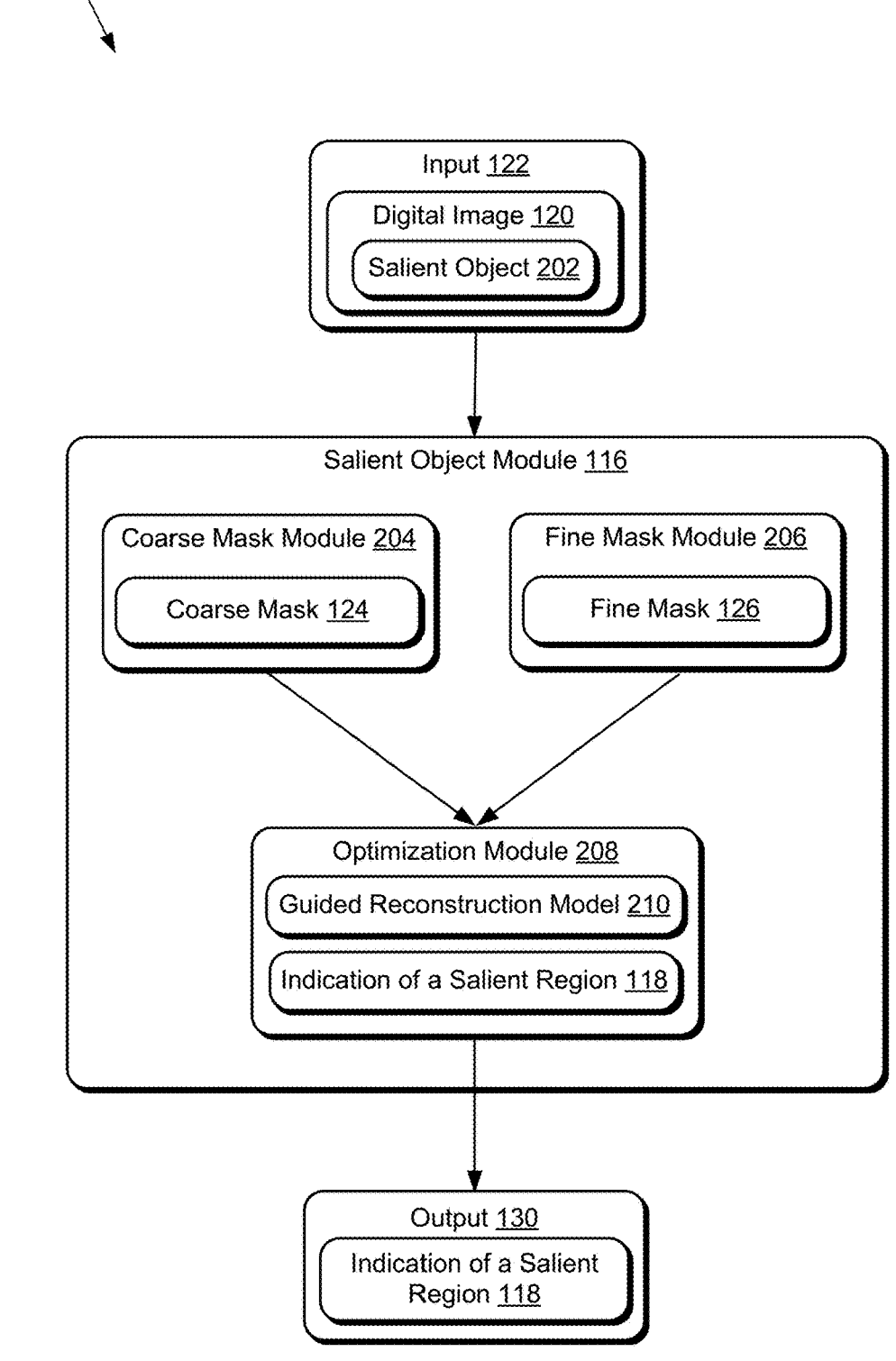
FIG. 2 depicts a system in an example implementation showing operation of a salient object module for generating salient regions based on multi-resolution partitioning.

FIG. 2 depicts a system 200 in an example implementation showing operation of the salient object module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-7.

To begin in this example, a salient object module 116 receives an input 122 including a digital image 120. The digital image 120 depicts a salient object 202. For example, the salient object 202 is a prominent or distinctive object that catches a viewer's attention and stands out from its surroundings due to color, texture, contrast, or shape that differs from the surroundings of the salient object 202. A portion of the digital image 120 that features the salient object 202 is a salient region.

The salient object module 116 also include both a coarse mask module 204 and a fine mask module 206 that simultaneously generate a coarse mask 124 and a fine mask 126, respectively. In this example, the coarse mask module 204 receives processed patch embeddings based on the digital image 120. For example, the processed patch embeddings are generated by a Transformer Encoder based on patches of the digital image 120 generated by a DINO model. The coarse mask module 204 uses a partitioning model to predict whether the patches are part of one of two partitions of the digital image 120. The salient object module 116 uses an adjacency matrix to map semantic similarity of the patches output from the DINO model onto points of a graph. The coarse mask module 204 uses Normalized Cut (Ncut) to partition points represented on the adjacency matrix into the one of the two partitions.

The fine mask module 206 receives the digital image 120 and the processed patch embeddings. To generate the fine mask 126, the fine mask module 206 processes and scales up the digital image 120 using the processed patch embeddings. A partitioning model then divides the digital image 120 into partitions by predicting which processed patches are part of one partition or another partition based on similarities between the processed patches. The digital image 120, including the partitions, is passed through a pooling layer to shrink the digital image 120 into a fine mask 126 that has a level of resolution that matches the coarse mask 124.

The salient object module 116 also includes an optimization module 208. After the coarse mask module 204 generates the coarse mask 124 and the fine mask module 206 generates the fine mask 126, the optimization module 208 uses a guided reconstruction model 210 to generate an indication of a salient region 118. For example, the guided reconstruction model 210 is a Graph Total Variation (GTV) reconstruction model that determines which pixels in a digital image belong to a salient region. For example, the guided reconstruction model 210 analyzes nearby pixels in the coarse mask 124 and the fine mask 126 to determine which pixels belong to the salient region. The guided reconstruction model 210 discussed in detail below with respect to FIG. 3. Based on this determination from the guided reconstruction model 210, the optimization module 208 identifies a salient region in the digital image 120 and generates an indication of the salient region 118.

After the optimization module generates the indication of the salient region 118, the salient object module 116 generates an output that includes the indication of the salient region 118. For example, the indication of the salient region 118 includes a boundary line or mask displayed relative to the digital image 120 in the user interface 110 indicating a location of the salient region in the digital image 120.

Figure 3:
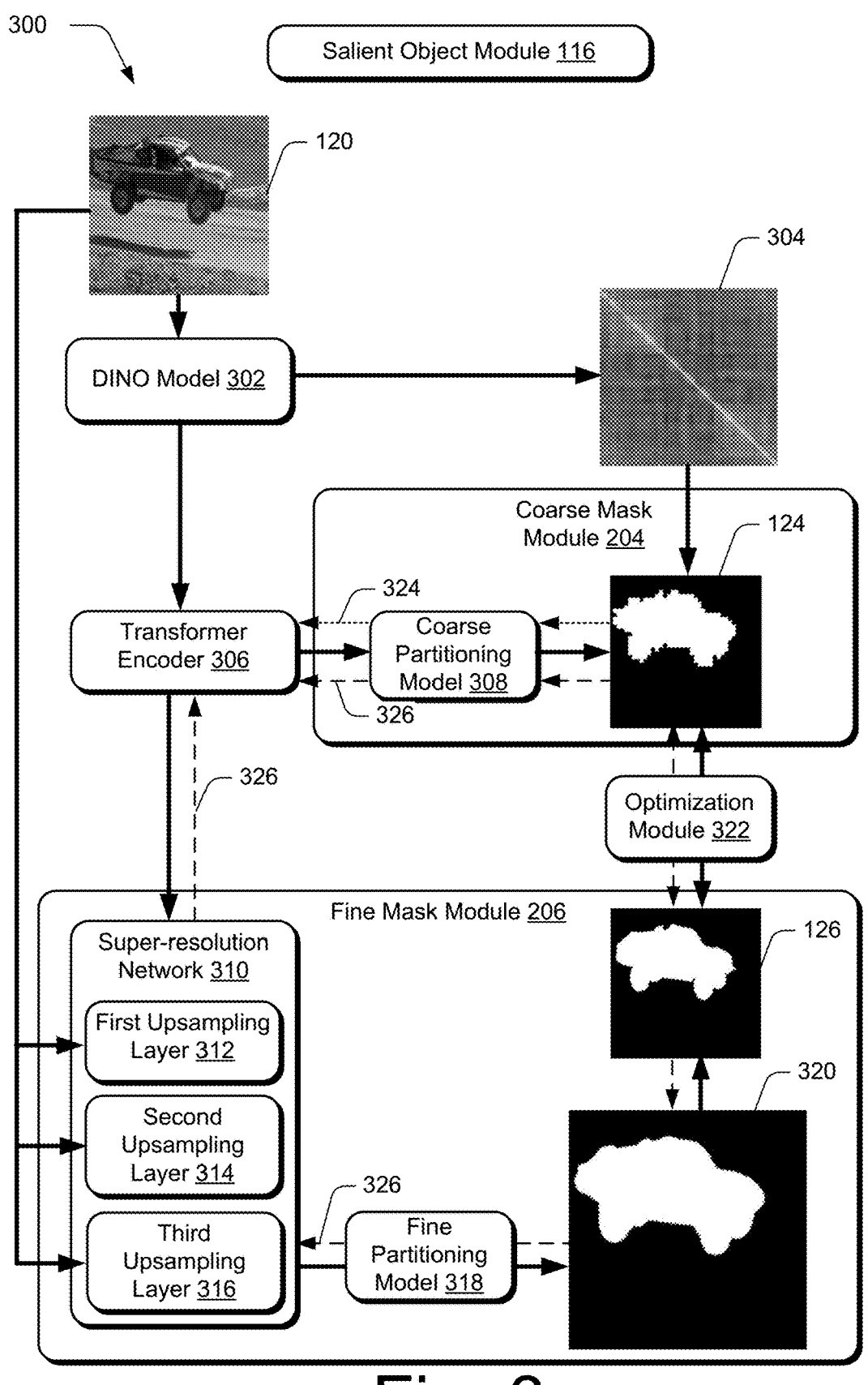
FIG. 3 depicts an example of an architecture of the salient object module.

FIG. 3 depicts an example 300 of an architecture of the salient object module. As illustrated, the salient object module 116 first receives an input 122 including the digital image 120. The digital image 120 is an image captured directly by the computing device 102 using an image capture device or is imported to the computing device 102. The digital image 120 includes a salient region and a non-salient region, which have yet to be identified. In some examples, the salient region includes a salient object. For example, the salient object stands out and draws immediate attention when observed by a viewer. In some examples, the salient object is depicted in a foreground of the digital image 120, while the non-salient region is depicted in a background of the digital image 120.

To identify the salient object in the digital image 120, the salient object module 116 first uses a DINO model 302 to break the digital image 120 into a grid of patches. The DINO model 302 also generates embeddings for the patches. The DINO model 302 is a self-supervised vision model that emits features that are contextually aware and captures semantic richness of the digital image 120. For example, the DINO model 302 is based on a vision transformer that generates an embedding for each patch. Specifically, given an image of dimensions $C \times H \times W$, and a self-supervised learning (SSL) embedder operating with patch size p, the DINO model 302 obtains a tensor of size $D \times (H/p \times W/p+1)$, including the embedding for the classification token that represents the entire digital image. In this example, the salient object module 116 leverages the self-supervised ViT-s/8 transformer, which processes a 320×320 image X as a 40×40 positionally aware flattened sequence of 8×8 non overlapping patches. In this example, the transformation is denoted by:

$$DINO(X) : X \in \mathbb{R}^{3 \times 320 \times 320} \rightarrow F \in \mathbb{R}^{384 \times 40 \times 40}.$$

The DINO model 302 emits $\mathbb{R}^{384 \times (1 + 40 \times 40)}$, and the classification token feature is discarded for subsequent modules. In this example, the DINO backbone remains frozen.

An adjacency matrix 304 is then generated that maps pairwise semantic similarity of the patches output from the DINO model 302 onto points of a graph. The adjacency matrix 304 is a square matrix used to represent a graph's connections or relationships between its nodes. For example, the adjacency matrix 304 is a binary matrix that shows a presence or absence of an edge between each pair of nodes. If there is an edge between nodes i and j, then the corresponding entry in the adjacency matrix is 1; otherwise, it is 0. Alternatively, the salient object module 116 generates an affinity matrix that measures similarity or affinity between data points in a dataset. For example, the adjacency matrix 304 includes a graph G=(V,E) that contains patches V and connections between any two patches are encoded in the edge list E. Each patch $v \in V$ has an associated normalized DINO embedding $F_v$. The adjacency matrix is given by the feature correspondences:

$$W_{ij} = \begin{cases} 1 \mid \langle F_{v_i}, F_{v_j} \rangle > \\ \epsilon \mid \text{otherwise} \end{cases} \tau.$$

A transformer encoder 306 processes the patches output from the DINO model 302 to generate patch embeddings. For example, the transformer encoder 306 is a single layer transformer encoder with two attention heads that transform:

$$F \in \mathbb{R}384 \times 40 \times 40$$

to $$\tilde{F} \in \mathbb{R}384 \times 40 \times 40$$

$$\tilde{F} \leftarrow TRANSFORMERENCODER(F)$$

where emitted features $\tilde{F}$ are shared between the coarse mask module 204 and the fine mask module 206. In some examples, the transformer encoder is a ViT-s/8 transformer.

The coarse mask module 204 uses a coarse partitioning model 308 that divides the digital image 120 into two partitions and predicts which patch embeddings output from the transformer encoder 306 belongs to each of the two partitions. In this example, the partitions include a salient partition and a non-salient partition. For example, the coarse partitioning model 308 includes a linear classification head for transforming the low resolution features into a coarse mask 124 in the form of a soft partitioning indicator vector $S_{coarse} \in [0, 1]^{|V|}$ where $|V|$=40×40. For partitions A and B with their indicator vectors $S_A = S_{coarse}$ and $S_B = 1 - S_A$, is rewritten as:

$$\mathcal{L}_{Ncut}(X) := Ncut(A, B) = \sum_{i \in \{A,B\}} \frac{S_i^T W (1 - S_i)}{S_i^T W 1}$$

where $\mathcal{L}$ denotes a loss function.

To generate the coarse mask 124, the coarse mask module 204 also uses a Normalized Cut (Ncut), which is a graph-based computer clustering algorithm that groups data points into distinct segments, to partition points represented on the adjacency matrix into the one of the two partitions, such that a similarity between the partitions is low. The normalized cut of a weighted undirected complete graph G=(V,E,w) where $w_{ij} > 0$ denotes the weight of (i, j)∈E, is given by a binary graph signal s:v∈V→s(v)∈{0, 1} that minimizes:

$$Ncut(A, B) = \frac{w(A, B)}{w(A, V)} + \frac{w(B, A)}{w(B, V)}$$

where A:={v|v∈ V,s(v)=0}, B:={v|v∈ V,s(v)=1} and w(A, B):=$\Sigma_{s(i)=0,s(j)=1} w_{i,j}$. Non-linear parameterizations of the graph signal enable deep partitioning and regularization based on the normalized cut.

The coarse mask 124 represents a partition of the digital image 120 that is more prominent than the fine mask 126 and estimates a location of the salient region in the digital image 120. For example, the coarse mask is 40×40 patches and amplifies sematic distinguishability between the two partitions, where the affinity between image patches i and j is computed using DINO embeddings and denoted by Wij. Because the coarse mask 124 provides a rough estimation of a boundary of the salient region but fails to capture finer high-frequency details at the original image resolution of the digital image 120, a fine mask 126 is also generated simultaneously with the coarse mask 124. The coarse mask 124 and the fine mask 126 are co-optimized to correct inaccuracies of the coarse mask 124 while preserving fine boundary details of the fine mask 126.

To generate the fine mask 126, the fine mask module 206 first receives the patch embeddings from the transformer encoder 306. Informed by the digital image 120, the fine mask module 206 uses a super-resolution network 310 to process and scale up the digital image 120 based on the patch embeddings. In this example, the super-resolution network 310 has a first upsampling layer 312, a second upsampling layer 314, and a third upsampling layer 316. In other examples, the super-resolution network 310 includes a different number of upsampling layers. For example, patch embeddings output from the transformer encoder 306 are gradually scaled up from 40×40 to 320×320 in three steps. In each step, the image is first scaled up 2× using bilinear interpolation and processed through a convolutional block. The input images are also concatenated and resized to the input size of each convolutional block.

The fine mask module 206 uses a fine partitioning model 318 that divides the digital image 120 into two partitions and predicts which processed features of the scaled up digital image output from the super-resolution network 310 belong to each of the two partitions. For example, the features $\hat{F} \in \mathbb{R}^{131 \times 320 \times 320}$ from the last convolutional block are linearly classified into $S_{fine} \in [0, 1]^{320 \times 320}$ which is subsequently average pooled to $\hat{S}_{fine} \in [0, 1]^{40 \times 40}$ for aligning with the $S_{coarse} \in [0, 1]^{40 \times 40}$. The corresponding loss function is given as:

$$\mathcal{L}_{SR}(X) := \left\| \hat{S}_{fine} - S_{coarse} \right\|_2^2.$$

This linear classification is used to identify an initial fine mask 320, which is then passed through a pooling layer to shrink the initial fine mask 320 to a fine mask 126 that has a level of resolution that matches the coarse mask 124. The fine mask 126 captures high-frequency details of the original image resolution of the digital image 120. In some examples, the fine mask 126 is trained to replicate the coarse mask 124 when downsampled to resolution of the coarse mask 124. Additionally, the fine mask 126 leverages Red, Green, Blue (RGB) color model features at progressive sizes for supplementing coarse features.

Based on the coarse mask 124 and the fine mask 126, the salient object module 116 uses an optimization module 322 to generate an indication of a salient region 128. For example, the optimization module 322 uses guided reconstruction to co-optimize the coarse mask 124 and the fine mask 126 by correcting the inaccuracies of the coarse mask 124 while simultaneously preserving boundary details to the fine mask 126.

For example, the salient object module 116 uses a Graph Total Variation (GTV) model to optimize the indication of the salient region 118. The GTV model analyzes nearby pixels that show similar behavior to determine which pixels belong to the salient region. For example, the GTV model uses a similarity metric between pixels of an image X to populate the affinity matrix A>0, which is then used to compute the degree matrix D. The graph Laplacian L=D−A is used to compute a graph regularizer in the quadratic form for a graph signal s, given by:

$$\mathcal{L}_{reg} = \frac{1}{2} \sum_{(i,j) \in E} A_{ij}(s(i) - s(j))^2$$

where $A_{ij}=0$ is enforced when pixels $X_i$ and $X_j$ are not vertically or horizontally adjacent, also known as the pixel neighborhood N. This is equivalent to a weighted version of the total variation (TV) loss.

Because guided super-resolution results in more than one fine mask for a given coarse mask in some examples, the GTV loss contributes both as a denoiser and as a regularizer. For example, $$A_{ij} = \exp\left(-\|X_i - X_j\|_2^2 / \sigma\right)$$

is given by the euclidean similarity between the pairwise pixels. As a result, the LGTV-fine loss encourages the upsampler to leverage color information. Regarding the coarse mask 124, the optimization module 322 uses a graph TV regularizer, denoted by $\mathcal{L}_{GTV\text{-}coarse}$ based on $A_{ij}=W_{ij}\mathbb{1}\{i \in N(j)\}$, which denoises and predicts a smooth coarse mask. In some examples, the GTV model discourages island pixels at low resolutions and encourages the fine mask 126 to follow contours of the digital image 120.

Losses from the normalized cut of the coarse mask 124 and the guided super-resolution of the fine mask 126, together with GTV losses drive joint learning of the coarse mask 124 and the fine mask 126. The GTV losses are involved in denoising and predicting masks and regularizing the overall learning process GTV model. A loss function for the coarse branch is:

$$\mathcal{L}_{coarse}(x) = \mathcal{L}_{Ncut}(x) + \lambda_{GTV\text{-}coarse}\mathcal{L}_{GTV\text{-}coarse}$$

and a loss function for a fine branch is:

$$\mathcal{L}_{fine} = \lambda_{SR}\mathcal{L}_{SR}(X) + \lambda_{GTV\text{-}fine}\mathcal{L}_{GTV\text{-}fine}$$

and a final expected self-supervised loss function is:

$$\mathcal{L} = \mathbb{E}_{X \sim \mathbb{P}(X)}[\mathcal{L}_{coarse}(x) + \mathcal{L}_{fine}(x)]$$

which iteratively refines parameters of the transformer encoder 306, the super-resolution network 310, the transformer encoder 306, and the fine partitioning model 318. For example, dotted arrows 324 represent gradient flow from the normalized cut of the coarse mask 124 to components that generate the coarse mask 124, including the transformer encoder 306 and the coarse partitioning model 308. Dashed arrows 326 represent optimization of the transformer encoder 306, the coarse partitioning model 308, the super-resolution network 310, and the fine partitioning model 318 based on the loss functions of the optimization module 322.

The optimization module 322 generates an output 130 including a partitioning of the digital image that indicates a salient region and a non-salient region. To generate the indication of the salient region 128, the salient object module 116 determines which partition is the salient region. In some examples, the background is the non-salient region by default, and the salient object module 116 identifies the background as the partition that includes pixels in three or four corners of the digital image 120. In some examples, a partition has pixels in two corners, and the salient object module 116 identifies the salient region as the smaller of the two partitions. The salient object module 116 then outputs the indication of a salient region 128 for display in the user interface 110 by co-optimizing the coarse mask 124 and the fine mask 126 in parallel and guided by the above loss function for the coarse branch, the loss function for the fine branch, and the final expected self-supervised loss function. In some examples, the salient region 128 is based on an optimized version of the coarse mask 124 informed by the fine mask 126.

Figure 4:
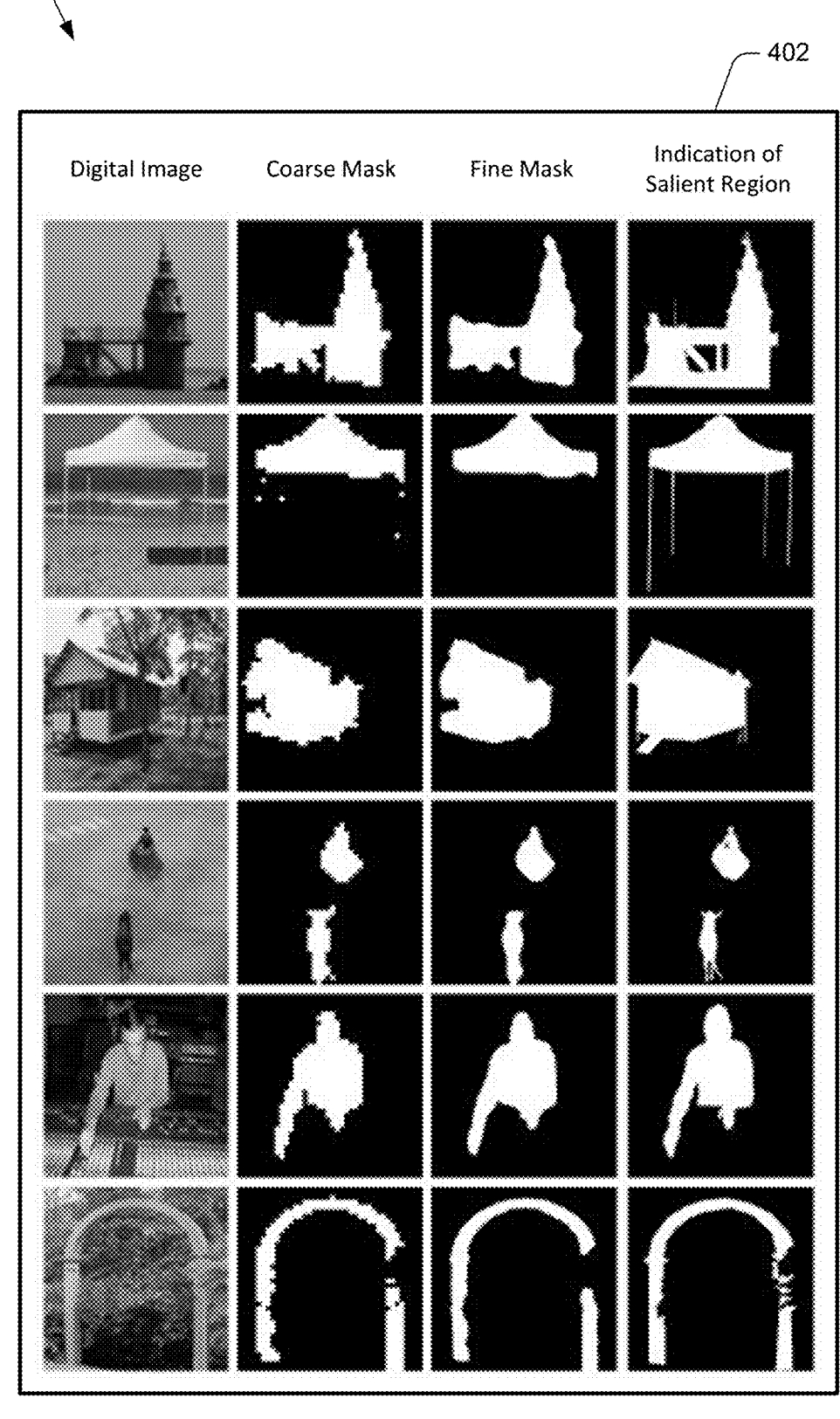
FIG. 4 depicts an example including a table of outputs including different indications of salient regions.

FIG. 4 depicts an example 400 including a table 402 of outputs including different indications of salient regions. For example, the salient object module 116 generates an output including the indication of the salient region 118 based on the coarse mask 124 and the fine mask 126. As illustrated, generating salient regions based on multi-resolution partitioning results in accurate indications of salient regions that have sharper salient region boundaries than conventional techniques.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-4.

FIG. 5 depicts a procedure 500 in an example implementation of generating salient regions based on multi-resolution partitioning. At block 502, a digital image 120 including a salient object is received.

At block 504, a first mask for the salient object is generated by partitioning the digital image 120 into salient and non-salient regions. In some examples, the first mask is trained to minimize a normalized cut based on an adjacency matrix 304. Additionally or alternatively, the first mask is generated using a Self-Distillation with No Labels (DINO) model 302 to generate embeddings for patches of the digital image 120. For example, the embeddings for the patches of the digital image 120 are processed by a transformer encoder 306.

At block 506, a second mask for the salient object is generated that has a resolution that is different than the first mask by partitioning a resampled version of the digital image 120 into salient and non-salient regions. In some examples, the first mask and the second mask are generated simultaneously. Additionally or alternatively, the second mask is trained to replicate the first mask when downsampled to a resolution of the first mask. In some examples, the resampled version of the digital image is an upsampled version of the digital image.

At block 508, an indication of a salient region 128 of the digital image 120 is generated based on the first mask and the second mask using a machine learning model. In some examples, the machine learning model is a Graph Total Variation Regularizer model that uses guided reconstruction to optimize the indication of the salient region. Some examples further comprise regularizing the first mask and the second mask using Graph Total Variation (GTV) that discourages island pixels at low resolution and encourages the second mask to follow contours in the digital image 120.

At block 510, the indication of the salient region 128 is displayed in a user interface 110.

FIG. 6 depicts a procedure 600 in an additional example implementation of generating salient regions based on multi-resolution partitioning. At block 602, a digital image 120 including a salient region is received.

At block 604, a first mask for the salient region is generated by partitioning embeddings of patches of the digital image 120. In some examples, the first mask is trained to minimize a normalized cut based on an adjacency matrix. Additionally or alternatively, the first mask is generated using a Self-Distillation with No Labels (DINO) model 302. In some examples, the embeddings for patches of the digital image are processed by a transformer encoder 306.

At block 606, a second mask for the salient region is generated that has a resolution of the digital image 120 by partitioning embeddings of patches of a resampled version of the digital image 120. In some examples, the first mask and the second mask are generated simultaneously. Additionally or alternatively, the second mask is trained to replicate the first mask when downsampled to a resolution of the first mask.

At block 608, the first mask is optimized based on the second mask using a machine learning model. In some examples, the machine learning model is a Graph Total Variation regularizer model that uses guided reconstruction to optimize the optimized first mask.

At block 610, the optimized first mask is displayed in a user interface 110.

Example System and Device

Figure 7:
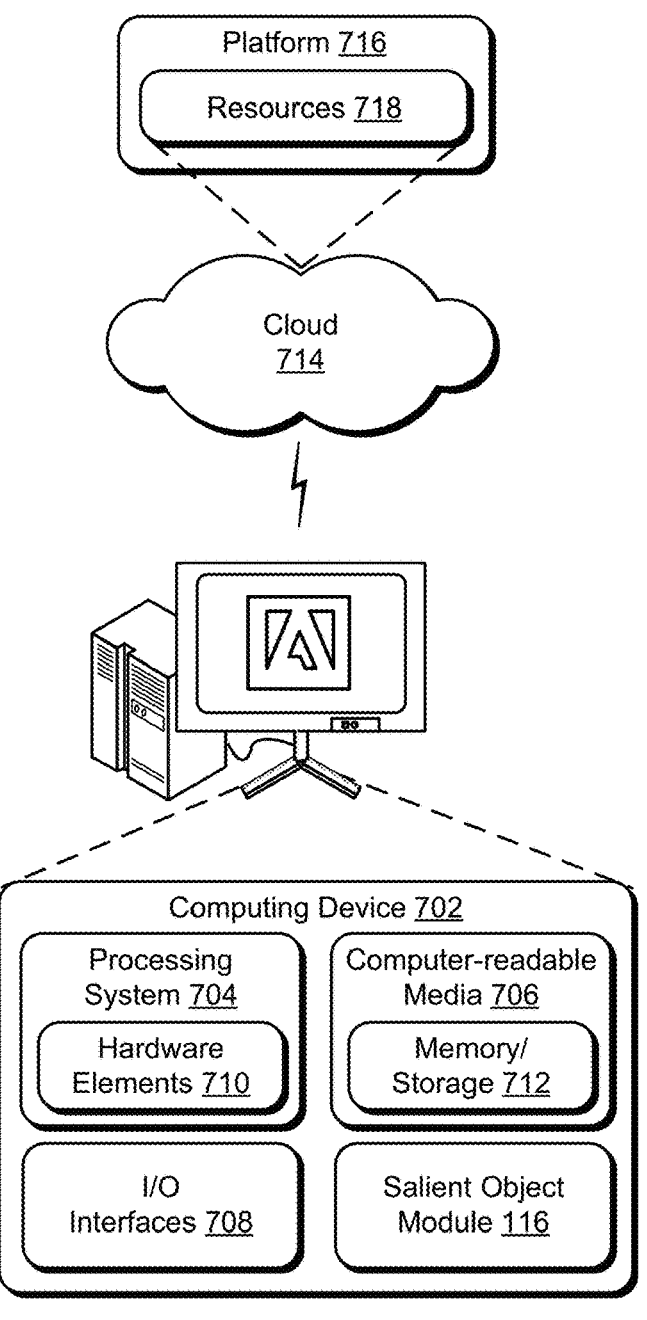
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the salient object module 116. The computing device 702 is configurable, for example, as a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing system 704. The instructions and/or functions are executable/operable by one or more articles of manufacture (for example, one or more computing devices and/or processing systems 704) to implement techniques, modules, and examples described herein.

The techniques described herein are supported by various configurations of the computing device 702 and are not limited to the specific examples of the techniques described herein. This functionality is also implementable through use of a distributed system, such as over a "cloud" 1114 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized when computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

What is claimed is:
1. A method comprising:
receiving, by a processing device, a digital image including a salient object;
generating, by the processing device, a first mask identifying a location of the salient object by partitioning the digital image into salient and non-salient regions;
generating, by the processing device, a second mask for the salient object that has a resolution that is different than the first mask by partitioning a resampled version of the digital image into salient and non-salient regions;
generating, by the processing device, an indication of a salient region of the digital image based on the location of the salient object of the first mask and the resolution of the second mask using a machine learning model; and displaying, by the processing device, the indication of the salient region in a user interface.

2. The method of claim 1, wherein the first mask and the second mask are generated simultaneously.

3. The method of claim 1, wherein the machine learning model comprises at least one of a Self-Distillation with No Labels (DINO) model, a transformer encoder, an upsampling network, or a Graph Total Variation Regularizer model that uses guided reconstruction to optimize the indication of the salient region.

4. The method of claim 1, wherein the first mask is trained to minimize a normalized cut based on an adjacency matrix.

5. The method of claim 1, wherein the second mask is trained to replicate the first mask when downsampled to a resolution of the first mask.

6. The method of claim 1, wherein the resampled version of the digital image is an upsampled version of the digital image.

7. The method of claim 1, wherein the first mask is generated using a Self-Distillation with No Labels (DINO) model to generate embeddings for patches of the digital image.

8. The method of claim 7, wherein the embeddings for the patches of the digital image are processed by a transformer encoder.

9. The method of claim 1, further comprising regularizing the first mask and the second mask using Graph Total Variation (GTV) that discourages island pixels at low resolution and encourages the second mask to follow contours in the digital image.

10. A non-transitory computer-readable storage medium storing executable instructions, which when executed by a processing device, cause the processing device to perform operations comprising:

receiving a digital image including a salient object;

generating a first mask identifying a location of the salient object by partitioning the digital image into salient and non-salient regions;

generating a second mask for the salient object that has a resolution that is different than the first mask by partitioning a resampled version of the digital image into salient and non-salient regions;

generating an indication of a salient region of the digital image based on the location of the salient object of the first mask and the resolution of the second mask using a machine learning model; and displaying the indication of the salient region in a user interface.

11. The non-transitory computer-readable storage medium of claim 10, wherein the first mask and the second mask are generated simultaneously.

12. The non-transitory computer-readable storage medium of claim 10, wherein the machine learning model comprises at least one of a Self-Distillation with No Labels (DINO) model, a transformer encoder, an upsampling network, or a Graph Total Variation Regularizer model that uses guided reconstruction to optimize the indication of the salient region.

13. The non-transitory computer-readable storage medium of claim 10, wherein the first mask is trained to minimize a normalized cut based on an adjacency matrix and the second mask is trained to replicate the first mask when downsampled to a resolution of the first mask.

14. A system comprising:

a memory component; and a processing device coupled to the memory component, the processing device to perform operations comprising:

receiving a digital image including a salient object;

generating a first mask identifying a location of the salient object by partitioning the digital image into salient and non-salient regions;

generating a second mask for the salient object that has a resolution that is different than the first mask by partitioning a resampled version of the digital image into salient and non-salient regions;

generating an indication of a salient region of the digital image based on the location of the salient object of the first mask and the resolution of the second mask using a machine learning model; and displaying the indication of the salient region in a user interface.

15. The system of claim 14, wherein the first mask and the second mask are generated simultaneously.

16. The system of claim 14, wherein the machine learning model comprises at least one of a Self-Distillation with No Labels (DINO) model, a transformer encoder, an upsampling network, or a Graph Total Variation Regularizer model that uses guided reconstruction to optimize the indication of the salient region.

17. The system of claim 14, wherein the first mask is trained to minimize a normalized cut based on an adjacency matrix.

18. The system of claim 14, wherein the first mask is generated using a Self-Distillation with No Labels (DINO) model to generate embeddings for patches of the digital image.

19. The system of claim 18, wherein the embeddings for the patches of the digital image are processed by a transformer encoder.

20. The method of claim 1, wherein the generating the salient region of the digital image further comprises co-optimizing the first mask with the second mask.

* * * * *